United States Patent [19]
Fitzmayer

[11] 3,936,627
[45] Feb. 3, 1976

[54] MICROWAVE OVEN WITH SPECIAL RACK DESIGNS

[75] Inventor: Louis H. Fitzmayer, Louisville, Ky.

[73] Assignee: General Electric Company, Louisville, Ky.

[22] Filed: Jan. 17, 1974

[21] Appl. No.: 434,232

[52] U.S. Cl. .......................................... 219/10.55 F
[51] Int. Cl.² .......................................... H05B 9/06
[58] Field of Search..... 219/10.55, 10.55 F, 10.55 E

[56] References Cited
UNITED STATES PATENTS

| | | | |
|---|---|---|---|
| 2,912,554 | 11/1959 | Snyder | 219/10.55 F |
| 2,961,520 | 11/1960 | Long | 219/10.55 |
| 3,121,158 | 2/1964 | Hurko | 219/397 |
| 3,189,722 | 6/1965 | Fritz | 219/10.55 F |
| 3,230,864 | 1/1966 | Krajewski | 219/10.55 |
| 3,514,576 | 5/1970 | Hilton et al. | 219/10.55 UX |
| 3,591,751 | 7/1971 | Goltos | 219/10.55 E |
| 3,855,440 | 12/1974 | Staats et al. | 219/10.55 F |

Primary Examiner—Bruce A. Reynolds
Attorney, Agent, or Firm—Prangley, Dithmar, Vogel, Sandler & Stotland

[57] ABSTRACT

A self-cleaning microwave oven comprises a heating cavity, source means including a disc antenna and a rotating mode stirrer for exciting in the heating cavity two predetermined electromagnetic field modes, a first metal rack horizontally disposed near the bottom of the cavity and having spaced-apart rods extending parallel to the direction of the electric field of the two modes and terminating those modes, and a second metal rack horizontally disposable in a plurality of different positions above the first rack and having spaced-apart rods extending perpendicular to the direction of the electric field of the two modes and having no effect thereon.

16 Claims, 13 Drawing Figures

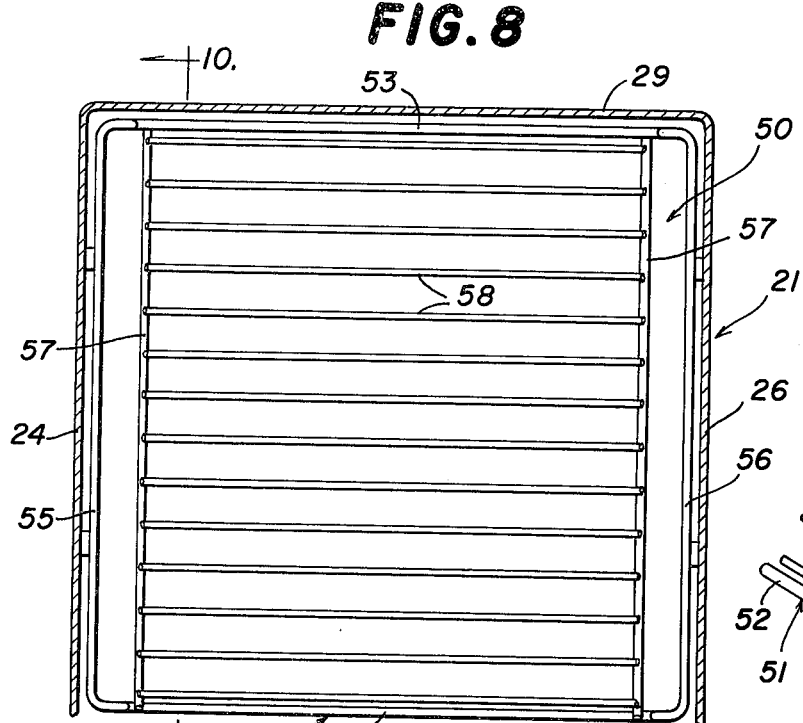
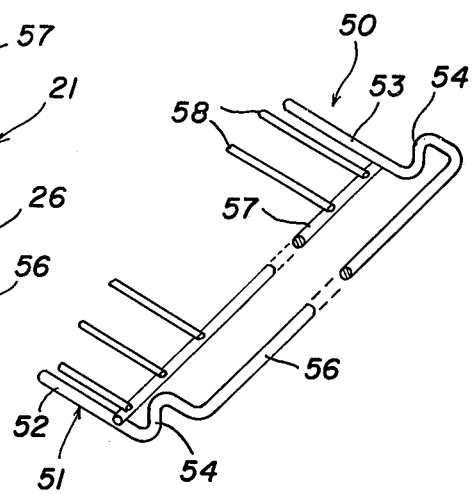
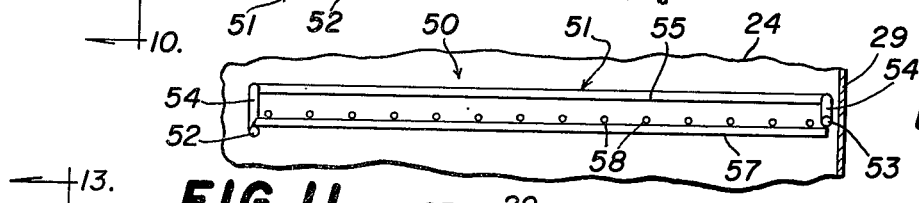
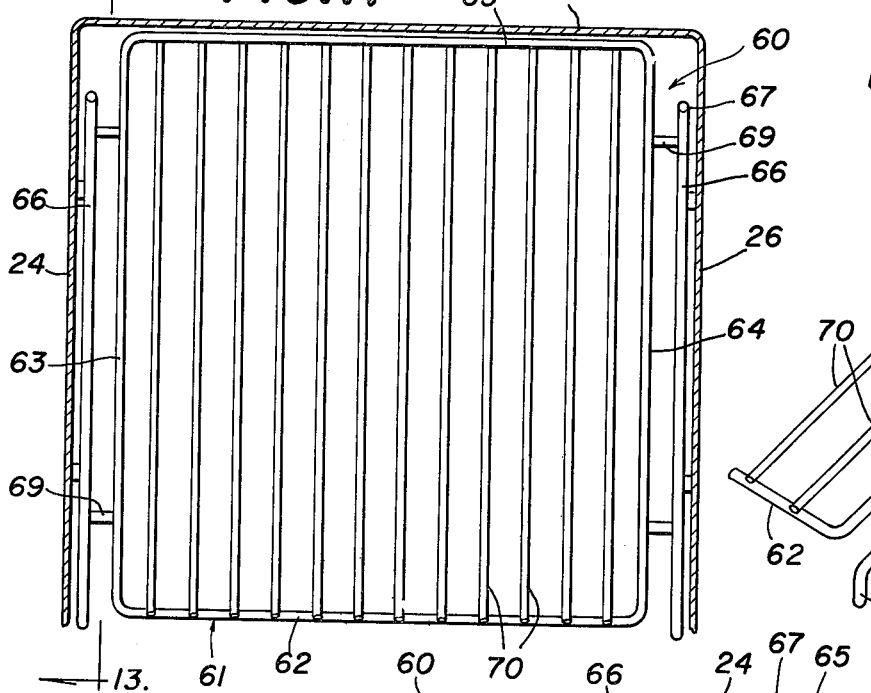
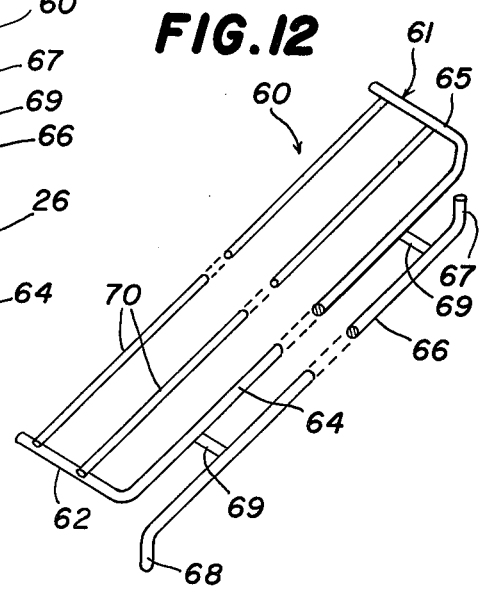
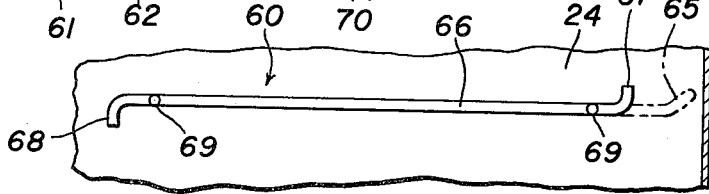

MICROWAVE OVEN WITH SPECIAL RACK DESIGNS

BACKGROUND OF THE INVENTION

This invention relates to electronic ovens which include both high frequency energy means as well as conventional electric heating units, together with a self-cleaning capability, and more particularly to an improved shelf arrangement for such ovens.

Electronic ovens utilize high frequency electromagnetic wave energy to heat directly and internally foodstuffs placed therein, whereas conventional electric ovens utilize radiant energy and circulating heated air for heating the external surfaces of the food to be cooked. In self-cleaning ovens, the oven liner and the elements disposed in the heating cavity are heated to a high temperature up to 1,000°F., well above the temperature range at which foods are normally cooked, for pyro-cleaning of the oven.

One of the problems presented by electronic ovens, and particularly those equipped with conventional electric heating units as well as a source of high frequency energy, concerns the shelves which are needed to support the food to be cooked. Because metal objects may absorb a substantial amount of the microwave energy supplied to the oven and also may distort the electric and magnetic field patterns so as to cause uneven cooking, shelves made of non-metallic dielectric materials have been used in some electronic ovens. However, these dielectric shelves are more costly than metal shelves, such as wire racks used in conventional ovens, and have proved to be quite unsatisfactory in combination electronic-electric ovens because of their poor heat resistance. This problem is particularly acute in self-cleaning ovens because of the extremely high temperatures reached during the self-cleaning operation. At present, there are no low cost dielectric materials which can operate over the temperature range experienced in a self-cleaning oven.

Accordingly, metal racks or shelves must be used in a self-cleaning oven. Metal shelf arrangements have been devised for use in electronic ovens. One such arrangement is disclosed in the U.S. Pat. No. 2,912,554 issued to F. R. Snyder on Nov. 10, 1959, and assigned to the assignee of the present invention. The Snyder patent discloses a metal oven rack having side rods which are spaced a predetermined distance from the side walls of the oven heating cavity, the rack being mounted on the side walls by means of support rods which are connected to the rack side rods by short connecting links respectively disposed at points of minimum induced voltage between the rack and the heating cavity side walls for the particular wavelength of microwave energy being used. But the principle of operation of the Snyder arrangement is not disclosed in that patent and it appears that the arrangement is effective only for the specific configuration illustrated in the patent, wherein the rack is disposed between the microwave antenna and the food to be heated. Furthermore, this arrangement does not permit the flexibility of locating the food at different positions in the oven heating cavity.

SUMMARY OF THE INVENTION

It is a general object of the present invention to provide an improved shelf arrangement for use in self-cleaning microwave ovens, which utilizes a metal shelf or rack to terminate the electromagnetic field modes established in the heating cavity.

Another general object of this invention is to provide a shelf arrangement wherein foods of different impedances may be selectively supported at varying positions in the heating cavity without distorting or otherwise adversely affecting the electromagnetic wave pattern in the heating cavity.

It is an important object of this invention to provide an electronic heating apparatus having pyro-cleaning means, the apparatus comprising a metal enclosure defining a heating cavity for receiving therein a body to be heated, source means for transmitting microwave energy of a predetermined frequency into the heating cavity for establishing therein a predetermined electromagnetic field mode, and a metal rack disposed horizontally within the heating cavity and having a plurality of spaced-apart rods extending substantially parallel to the direction of the electric field of the predetermined electromagnetic field mode, the rack being dimensioned and positioned in the heating cavity for terminating said predetermined electromagnetic field mode, whereby the rack permits the supporting thereon of a body to be heated while accommodating pyro-cleaning of the oven without interfering with the electromagnetic wave pattern in the heating cavity.

In connection with the foregoing object, it is another object of this invention to provide an electronic heating apparatus of the type set forth, wherein the source means includes an antenna, and further including a mode stirrer rotatably mounted in the heating cavity for cooperation with the antenna to establish in the heating cavity two predetermined electromagnetic field modes, the metal rack terminating both of said predetermined electromagnetic field modes.

Another object of this invention is to provide an electronic heating apparatus of the type set forth, which further includes a second metal rack disposed horizontally within the heating cavity above the first rack and having a plurality of spaced-apart rods extending substantially perpendicular to the direction of the electric field of the predetermined electromagnetic field mode, the second rack being movable among a plurality of different positions within the heating cavity above the first rack for facilitating optimum heating of associated bodies of different impedances while having no adverse effect on the electromagnetic field pattern in the heating cavity.

Further features of the invention pertain to the particular arrangement of the parts of the electronic heating apparatus whereby the above-outlined and additional operating features are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 8 is an enlarged view in horizontal section of the heating cavity of the oven of FIG. 1, illustrating the non-terminating rack in plan view;

FIG. 9 is a fragmentary perspective view of the non-terminating rack illustrated in FIG. 8;

FIG. 10 is a fragmentary view in vertical section of the non-terminating rack taken along the line 10—10 in FIG. 8;

FIG. 11 is a view similar to FIG. 8 illustrating the terminating rack of the oven of FIG. 1 in plan view;

FIG. 12 is a fragmentary front perspective view of the terminating rack of FIG. 11; and FIG. 13 is a fragmentary view in vertical section of one of the support rods of the terminating rack, taken along the line 12—12 in FIG. 11.

DESCRIPTION OF THE PREFERRED EMBODIMENT

Figure 1:
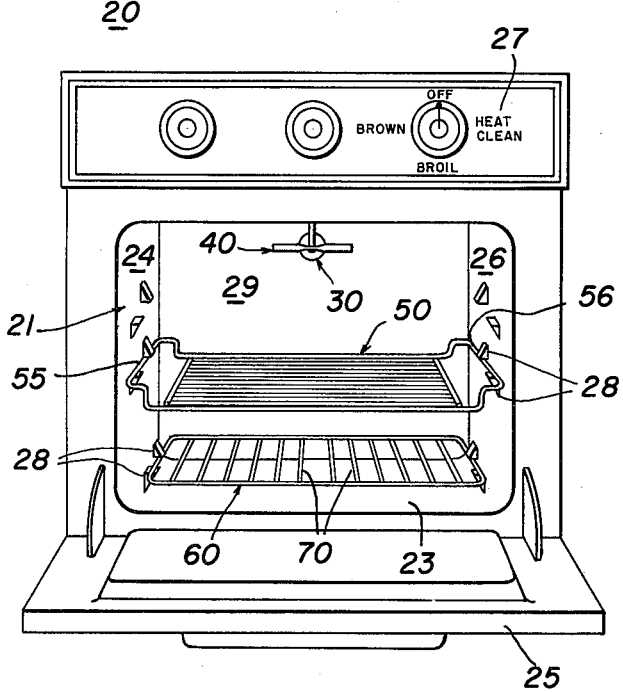
FIG. 1 is a front perspective view of an electronic oven constructed in accordance with and embodying the features of the present invention, and shown with the oven door in the open position thereof.
Figure 2:
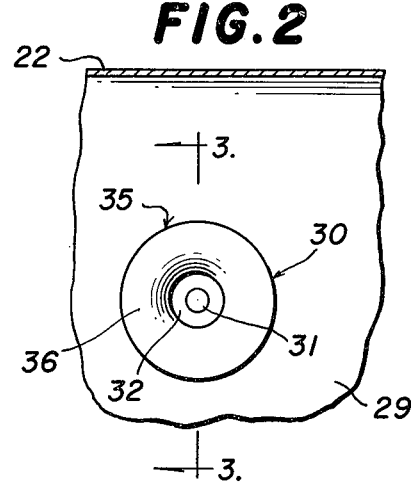
FIG. 2 is an enlarged fragmentary front elevational view of the microwave antenna of the electronic oven of FIG. 1.
Figure 3:
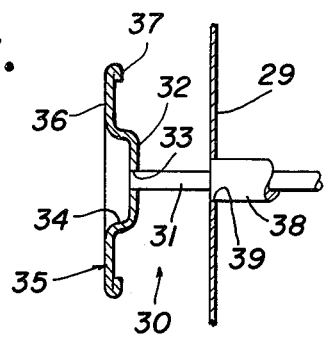
FIG. 3 is a view in vertical section taken along the line 3—3 in FIG. 2.
Figure 4:
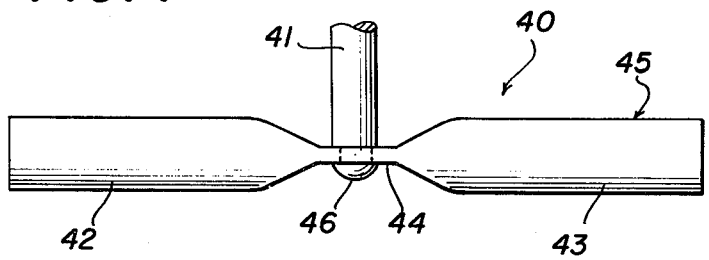
FIG. 4 is an enlarged fragmentary front elevational view of the mode stirrer of the electronic oven illustrated in FIG. 1.
Figure 5:
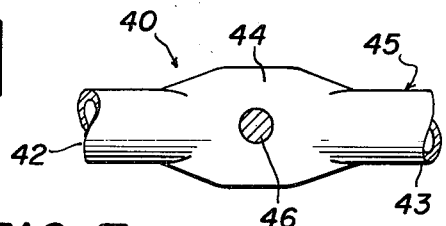
FIG. 5 is a fragmentary top plan view in partial section of the mode stirrer of FIG. 4.
Figure 6:
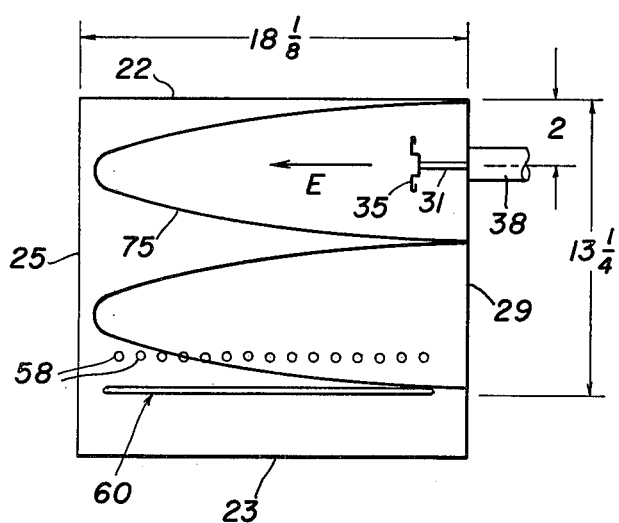
FIG. 6 is a diagrammatic side elevational view of the heating cavity of the electronic oven of FIG. 1, as viewed from the right-hand side thereof, and illustrating the electromagnetic field patterns for the predetermined modes established in the heating cavity.
Figure 7:
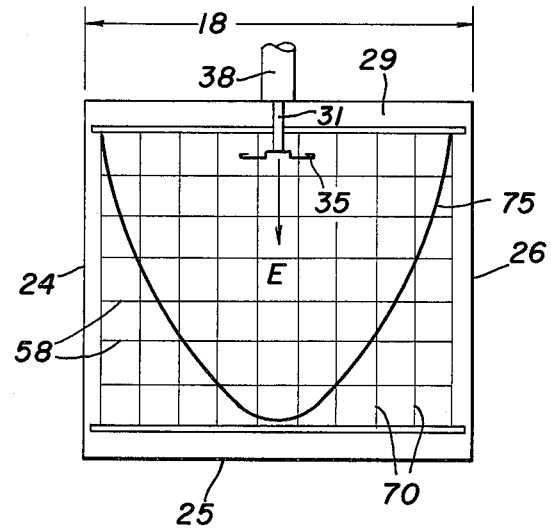
FIG. 7 is a diagrammatic top plan view of the heating cavity and one of the electromagnetic field modes illustrated in FIG. 6.

Referring now to FIGS. 1 through 7 of the drawings, there is illustrated an electronic microwave oven, generally designated by the numeral 20, having generally rectangular metallic walls defining an oven liner 21, including a top wall 22 (FIG. 2), a bottom wall 23, two opposed side walls 24 and 26, and a rear wall 29, all cooperating to define a heating cavity. The front wall of the heating cavity is formed by an oven door 25 which is movable between an open position, illustrated in FIG. 1, and a closed position (see FIGS. 6 and 7) for closing the heating cavity. In the preferred embodiment, the heating cavity has a width of 19 inches, a height of 16-7/16 inches and a depth of 19-⅛ inches.

Radiant heating units (not shown) may be provided adjacent to the top and bottom walls 22 and 23 of the oven liner in a well known manner for providing conventional heating of the food for broiling, browning and the like. A control panel 27 is provided at the front of the oven 20 above the heating cavity for mounting control instruments to regulate the supply of high frequency energy to the heating cavity and the energization of the radiant heating units and other oven mechanisms. Formed on each of the side walls 24 and 26 as by embossing are a plurality of shelf support members 28 for supporting shelves or racks in the heating cavity as will be described more fully below.

Disposed centrally of the rear wall 29 of the oven liner adjacent to the upper end thereof is an antenna structure, generally designated by the numeral 30, which includes a short cylindrical conductive probe 31 projecting horizontally into the heating cavity through an opening 39 in the rear wall 29 and coaxially connected at its inner end to a disc-like member 35. The disc-like member 35 has a circular central portion 32 provided with an opening 33 centrally thereof for receiving the end of the probe 31 therethrough, the central portion 32 being integral about the periphery thereof with an inturned annular flange 34. Integral with the flange 34 and extending radially outwardly thereof is an annular outer flange 36 having the peripheral edge thereof folded back against the rear surface thereof as at 37. The antenna probe 31 is connected to a coaxial transmission line 38 which is in turn coupled to the output of a suitable microwave source such as a magnetron tube (not shown) for supplying microwave energy of a predetermined frequency to the heating cavity. In the preferred embodiment of the invention, the microwave energy utilized is at a frequency of 915 MHz.

Mounted on the top wall 29 of the oven liner substantially centrally thereof is a mode stirrer, generally designated by the numeral 40. The mode stirrer 40 includes a cylindrical dielectric shaft 41 projecting vertically downwardly into the heating cavity, the shaft 41 being connected at its upper end to a suitable electric motor (not shown) disposed above the top wall 22 for rotating the shaft 41. Connected to the shaft 41 at the lower end thereof is a stirrer blade, generally designated by the numeral 45, which is integrally formed of two substantially tubular ends 42 and 43 interconnected by a flattened central portion 44, the flattened portion 44 lying in a plane substantially parallel to the top wall 22 of the oven liner and having an opening therethrough for receiving a fastener 46 for securing the blade 45 to the shaft 41. The stirrer blade 45 is formed of a conductive material and is preferably approximately ten and one-half inches long.

Referring now also to FIGS. 8 through 10 of the drawings, a metal food-supporting rack, generally designated by the numeral 50, is mounted in the heating cavity on the shelf support members 28. The rack 50 includes a generally rectangular peripheral frame member 51 including front and rear end rods 52 and 53 parallel to the rear wall 29, each terminated at the opposite ends thereof with an upwardly and outwardly extending elbow portion 54, the elbow portions 54 at the left-hand side of the rack 50, as viewed in FIG. 8, being interconnected by a support rod 55, and the elbow members 54 at the other side of the rack 50 being interconnected by a support rod 56. The peripheral frame member 51 may be integrally constructed of a metallic wire rod and is so dimensioned that the support rods 56 are adapted for supporting the rack 50 in a horizontal position in the heating cavity on the shelf support members 28.

Interconnecting the end rods 52 and 53 and secured thereto as by welding are two side bars 57, respectively spaced a predetermined distance inwardly of the support rods 55 and 56, the front ends of the side bars 57 overlying the front end rod 52 and the rear ends of the side bars 57 disposed beneath the rear end rod 53. In order to permit the side bars 57 to lie in a substantially horizontal plane when the rack 50 is mounted in the heating cavity, the rear end rod 53 is disposed above the plane of the front end rod 52 by a distance substantially equal to the thickness of the side bars 57. Interconnecting the side bars 57 and fixedly secured thereto as by welding and terminating thereat are a plurality of equidistantly spaced apart parallel coplanar crossbars 58 for supporting an associated food load in the heating cavity.

Preferably, the support rods 55 and 56 of the rack 50 are slidably movable along the shelf support members 28 into and out of the heating cavity, it being understood that the rack 50 may selectively be located at any of a number of different vertical positions in the heating cavity.

Also mounted within the heating cavity closely adjacent to the bottom wall 23 of the oven liner 21 is a metal food-supporting rack generally designated by the numeral 60. The rack 60 includes a generally rectangular peripheral frame member 61 which may be integrally formed of a wire rod and includes two spaced apart side rods 63 and 64 respectively parallel to the side walls 24 and 26 of the oven liner, and interconnected at the front end thereof by a front end rod 62. The rear ends of the side rods 63 and 64 are upturned and are interconnected by an elevated end rod 65. The peripheral frame member 60 is mounted in the heating cavity by means of a pair of support rods 66 each disposed substantially parallel to the side rods 63 and 64 and provided with upturned rear ends 67 and downturned front ends 68, the support rods 66 being respectively spaced laterally outwardly a predetermined distance from the side rods 63 and 64 and connected thereto by means of short spaced apart mounting stubs 69. The peripheral frame member 61 is dimensioned to be mounted on the shelf support members 28 by means of the support rods 66.

Interconnecting the front and rear end rods 62 and 65, and fixedly secured thereto as by welding and terminating thereat are a plurality of equidistantly spaced apart parallel coplanar crossbars 70, the front ends of the crossbars 70 overlying the front end rod 62 while the rear ends of the crossbar 70 are disposed beneath the rear end rod 65. When the rack 60 is mounted for use in the heating cavity, the crossbars 70 are disposed in a substantially horizontal plane.

In use, the rack 60 is mounted on the bottommost set of shelf support members 28 closely adjacent to the bottom wall 23 of the oven liner 21. The rack 60 may be slidably movable on the shelf support members 28 into and out of the heating cavity, but preferably the front and rear ends 68 and 67 of the support rod 66 engage suitable stop members (not shown) on the oven liner side walls 24 and 26 to limit sliding movement of the rack 60, thereby to prevent the rack 60 from coming in contact with the rear wall 29 and preventing sliding movement of the rack 60 out of the heating cavity.

In the preferred embodiment of the invention, the rack 60 is positioned approximately thirteen and one-quarter inches below the top wall 22 of the oven liner 21, the dimensions of the heating cavity and the positioning of the antenna structure 30 and the mode stirrer 40 being such that at the predetermined microwave frequency of 915 MHz., the antenna structure 30 and the mode stirrer 40 cooperate to establish in the heating cavity the $TE_{1,2,0}$ mode and the $TE_{1,2,1}$ mode, where the numeral subscripts respectively indicate the variations of the electromagnetic fields in the directions of the width, height and depth of the heating cavity. The crossbars 70 of the rack 60 extend substantially parallel to the side wall 24 and 26 of the oven liner 21, which is also parallel to the direction of the electric field E of the $TE_{1,2,0}$ and $TE_{1,2,1}$ modes, as indicated by the arrow in FIGS. 6 and 7. Thus the rack 60 is so constructed and positioned that it terminates both of the $TE_{1,2,0}$ and $TE_{1,2,1}$ modes, which are respectively designated by the numerals 75 and 76 in FIGS. 6 and 7.

It will be understood that food loads may be supported upon the mode terminating rack 60 for cooking in the heating cavity. However, since the positioning of the terminating rack 60 within the heating cavity is critical in order for it to terminate the $TE_{1,2,0}$ and $TE_{1,2,1}$ modes, this rack may not be moved from the position illustrated in the drawings during the cooking operation. Thus, the utility of the microwave oven 20 would be severely limited if only the terminating rack 60 were available, since food loads of different impedances must be placed at different positions with respect to the wave pattern in the heating cavity in order to achieve optimum heating thereof.

Accordingly, the non-terminating and adjustable-position rack 50 is provided for also supporting food loads at various positions in the heating cavity above the terminating rack 60. It is a significant feature of the present invention that the crossbars 58 of the non-terminating rack 50 extend substantially perpendicular to the direction of the electric field E of the $TE_{1,2,0}$ and $TE_{1,2,1}$ modes present in the heating cavity. Thus, the rack 50 will not terminate either of these modes, nor will it in any way disrupt or otherwise adversely affect the wave pattern in the heating cavity. More particularly, the electrical effect of the non-terminating rack 50 on the microwave pattern will be substantially the same as that of a rack made of dielectric material, without having any of the adverse thermal characteristics of dielectric materials. Thus, it will be appreciated that the combination of the terminating rack 60 and the non-terminating rack 50 will provide a high degree of versatility for the microwave oven 20 in efficiently heating food loads of varying impedances.

While, in the preferred embodiment of the invention the mode stirrer 40 is provided so that both the $TE_{1,2,0}$ and $TE_{1,2,1}$ modes will be established in the heating cavity, it will be understood that, if desired, the oven 20 may also be operated with only the $TE_{1,2,0}$ mode, in which case the mode stirrer 40 may be dispensed with, resulting in a more simplified construction. Similarly, while for maximum flexibility both of the racks 50 and 60 are utilized in the preferred embodiment, it will be understood that the microwave oven 20 may also be operated while using only the terminating rack 60.

From the foregoing, it can be seen that there has been provided a novel rack design for a microwave oven with a pryo-cleaning feature, wherein metal racks are used so as to permit pyro-cleaning of the oven while at the same time preventing any distortion of the electromagnetic field pattern in the heating cavity.

More particularly, there has been provided a microwave oven which establishes a predetermined electromagnetic field pattern therein, in utilizing a terminating rack having a plurality of rods extending in directions substantially parallel to the direction of the electric field of the modal pattern so that the rack terminates the operating modal pattern.

There has also been provided a microwave oven of the character described, which additionally includes a non-terminating rack movable among a plurality of positions in the heating cavity above the terminating rack, and having a number of parallel rods extending in directions substantially perpendicular to the direction of the electric field of the operating modal pattern, so that the non-terminating rack has negligible effect on the modal pattern.

There has also been provided a microwave oven of the character described which includes a disc antenna and a mode stirrer for exciting in the heating cavity two predetermined electromagnetic field modes.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an electronic heating apparatus, the combination comprising a metal enclosure defining a heating cavity for receiving therein a body to be heated, source means for transmitting microwave energy of a predetermined frequency into said heating cavity for establishing therein a predetermined electromagnetic field mode substantially at said predetermined frequency, and a metal rack disposed horizontally within said heating cavity and having a plurality of spaced-apart rods interconnected only adjacent to the ends thereof and extending substantially parallel to the direction of the electric field of said predetermined electromagnetic field mode, said rack being dimensioned and positioned in said heating cavity for terminating said predetermined electromagnetic field mode substantially at said predetermined frequency, whereby said rack permits the supporting thereon of a body to be heated while accommodating pyro-cleaning of the oven and the termination of said predetermined electromagnetic field mode in said heating cavity.

2. The electronic heating apparatus set forth in claim 1, wherein said predetermined frequency is 915 MHz.

3. The electronic heating apparatus set forth in claim 1, wherein said enclosure is substantially in the shape of a rectangular parallelepiped, said rack being disposed closely adjacent to the bottom wall of said enclosure.

4. The electronic heating apparatus set forth in claim 1, wherein said heating cavity has a width of 18 inches and a height of 16-7/16 inches and a depth of 18-⅛ inches.

5. The combination set forth in claim 1, wherein said enclosure is substantially in the shape of a rectangular parallelepiped, said rack being disposed closely adjacent to the bottom wall of said enclosure, said source means including an antenna structure comprising a conductive cylindrical probe projecting into said heating cavity and a conductive circular member connected to said probe at the inner end thereof.

6. The electronic heating apparatus set forth in claim 1, wherein said enclosure is substantially in the shape of a rectangular parallelepiped, the electric field of said predetermined electromagnetic field mode being directed substantially horizontally from the back of said heating cavity to the front thereof.

7. The combination set forth in claim 1, wherein said source means and said rack are disposed in said enclosure to accommodate the supporting therebetween of a body to be heated.

8. In an electronic heating apparatus, the combination comprising a metal enclosure defining a heating cavity for receiving therein a body to be heated, source means including an antenna for transmitting microwave energy of a predetermined frequency into said heating cavity, a mode stirrer rotatably mounted in said heating cavity for cooperation with said antenna to establish in said heating cavity two predetermined electromagnetic field modes substantially at said predetermined frequency, and a metal rack disposed horizontally within said heating cavity and having a plurality of spaced-apart rods interconnected only adjacent to the ends thereof and extending substantially parallel to the direction of the resultant electric field of said predetermined electromagnetic field modes, said rack being dimensioned and positioned in said heating cavity for terminating said two predetermined electromagnetic field modes substantially at said predetermined frequency, whereby said rack permits the supporting thereon of a body to be heated while accommodating pyro-cleaning of the oven and the termination of said predetermined electromagnetic field modes in said heating cavity.

9. The combination set forth in claim 8, wherein said antenna includes a conductive cylindrical probe projecting into said heating cavity, and a circular member connected to said probe at the inner end thereof.

10. The electronic heating apparatus set forth in claim 8, wherein said mode stirrer includes a horizontally disposed generally cylindrical conductive member having a flattened portion substantially midway between the ends thereof, a rotatable dielectric shaft connected to said cylindrical member at the flattened central portion thereof and disposed substantially normal to the longitudinal axis thereof, and means outside of said heating cavity for rotating said mode stirrer about the longitudinal axis of said shaft.

11. The combination set forth in claim 8, wherein said enclosure is substantially in the shape of a rectangular parallelepiped, said rack being disposed closely adjacent to the bottom of said enclosure, said antenna including a cylindrical conductive probe member projecting horizontally into said heating cavity, and a circular conductive member connected to said probe at the inner end thereof coaxially therewith, and wherein said mode stirrer includes a horizontally disposed generally cylindrical conductive member having a flattened portion substantially midway between the ends thereof, and a rotatable dielectric shaft connected to said cylindrical member at the flattened central portion thereof and disposed substantially normal to the longitudinal axis thereof.

12. In an electronic heating apparatus, the combination comprising a metal enclosure defining a heating cavity for receiving therein a body to be heated, source means for transmitting microwave energy of a predetermined frequency into said heating cavity for establishing therein a predetermined electromagnetic field mode substantially at said predetermined frequency, a first metal rack disposed horizontally within said heating cavity and having a plurality of spaced-apart rods interconnected only adjacent to the ends thereof and extending substantially parallel to the direction of the electric field of said predetermined electromagnetic field mode, said first rack being dimensioned and positioned in said heating cavity for terminating said predetermined electromagnetic field mode substantially at said predetermined frequency, and a second metal rack disposed horizontally within said heating cavity in the wave pattern of said predetermined electromagnetic field mode terminated by said first rack and having a plurality of spaced-apart rods interconnected only adjacent to the ends thereof and extending substantially perpendicular to the direction of the electric field of said predetermined electromagnetic field mode, said second rack being movable among a plurality of different positions within said heating cavity for facilitating optimum heating of associated bodies of different impedances while having no adverse effect on the electromagnetic field pattern in said heating cavity, whereby said racks permit the supporting thereon of bodies to be heated in a plurality of different positions within the heating cavity while accommodating pyro-cleaning of the oven and terminating of said electromagnetic field mode without otherwise interfering with the electromagnetic wave pattern in said heating cavity.

13. The electronic heating apparatus set forth in claim 12, wherein said enclosure is substantially in the shape of a rectangular parallelepiped, the electric field of said predetermined electromagnetic field mode being directed substantially from the rear of said heating cavity to the front thereof, said first rack being disposed closely adjacent to the bottom of said enclosure, and said second rack being disposed above said first rack.

14. The electronic heating apparatus set forth in claim 12, wherein each of said racks is capable of sliding movements into and out of said heating cavity.

15. In an electronic heating apparatus, the combination comprising a metal enclosure defining a heating cavity for receiving therein a body to be heated, source means including an antenna for transmitting microwave energy of a predetermined frequency into said heating cavity, a mode stirrer rotatably mounted in said heating cavity for cooperation with said antenna to establish in said heating cavity two predetermined electromagnetic field modes substantially at said predetermined frequency, a first metal rack disposed horizontally within said heating cavity and having a plurality of spaced-apart rods interconnected only adjacent to the ends thereof and extending substantially parallel to the direction of the resultant electric field of said predetermined electromagnetic field modes, said first rack being dimensioned and positioned in said heating cavity for terminating said two predetermined electromagnetic field modes substantially at said predetermined frequency, and a second metal rack disposed horizontally within said heating cavity in the wave pattern of said predetermined electromagnetic field modes terminated by said first rack and having a plurality of spaced-apart rods interconnected only adjacent to the ends thereof and extending substantially perpendicular to the direction of the resultant electric field of said predetermined electromagnetic field modes, said second rack being movable among a plurality of different positions within said heating cavity for facilitating optimum heating of associated bodies of different impedances while having no adverse effect on the electromagnetic field pattern in said heating cavity, whereby said racks permit the supporting thereon of bodies to be heated in a plurality of different positions within the heating cavity while accommodating pyro-cleaning of the oven and terminating of said electromagnetic field mode without otherwise interfering with the electromagnetic wave pattern in said heating cavity.

16. The combination set forth in claim 15, wherein said enclosure is substantially in the shape of a rectangular parallelepiped, said first rack being disposed closely adjacent to the bottom of said enclosure, said antenna including a cylindrical conductive probe member projecting horizontally into said heating cavity, and a circular conductive member connected to said probe at the inner end thereof coaxially therewith, and wherein said mode stirrer includes a horizontally disposed generally cylindrical conductive member having a flattened portion substantially midway between the ends thereof, and a rotatable dielectric shaft connected to said cylindrical member at the flattened central portion thereof and disposed substantially normal to the longitudinal axis thereof.

* * * * *